United States Patent [19]

Instance

[11] Patent Number: 4,781,773
[45] Date of Patent: Nov. 1, 1988

[54] MANUFACTURING CONTAINERS FROM MULTILAYERED MATERIAL

[76] Inventor: David J. Instance, Guinea Hall, Sellindge, Kent, United Kingdom

[21] Appl. No.: 84,634

[22] Filed: Aug. 11, 1987

[30] Foreign Application Priority Data

Dec. 22, 1986 [GB] United Kingdom ............. 8630546

[51] Int. Cl.⁴ .................. B29C 47/06; B32B 1/08; B32B 1/10
[52] U.S. Cl. ..................................... 156/69; 156/78; 156/244.13; 156/500; 206/822; 220/444; 220/902; 220/DIG. 13; 264/177.1; 425/113; 425/817 C; 428/398
[58] Field of Search .............. 156/69, 78, 244.13, 156/244.14, 500; 206/822; 220/444, 402, DIG. 13; 264/177.1; 425/817 C, 113; 428/398

[56] References Cited

U.S. PATENT DOCUMENTS

| | | | |
|---|---|---|---|
| 3,403,714 | 10/1968 | Hulm | 206/822 X |
| 3,810,839 | 5/1974 | Creaser | 220/444 X |
| 4,093,414 | 6/1978 | Swiatovy | 425/817 C X |
| 4,221,621 | 9/1980 | Seki et al. | 156/78 |
| 4,310,366 | 1/1982 | Van Manen | 156/69 |
| 4,533,050 | 8/1985 | Bake | 220/444 X |

*Primary Examiner*—Robert A. Dawson
*Attorney, Agent, or Firm*—Malcolm B. Wittenberg

[57] ABSTRACT

A method of manufacturing containers, the method comprising the steps of (a) extruding an elongate tube of plastics material, the tube having a rectangular outer cross-section and an elongate central cylindrical cavity; (b) cutting the tube transversely into a plurality of container body portions; (c) sealing a base to one end of each body portion; and (d) sealing a top to the other end of each body portion. The invention also provides apparatus for manufacturing containers, comprising an extrusion device for extruding an elongate tube of plastics material, the tube having a rectangular cross-section and an elongate central cylindrical cavity, a cutting device for cutting the tube transversely into a plurality of container body portions, a first sealing means for sealing a base to one end of each body portion and a second sealing means for sealing a top to the other end of each body portion.

14 Claims, 4 Drawing Sheets

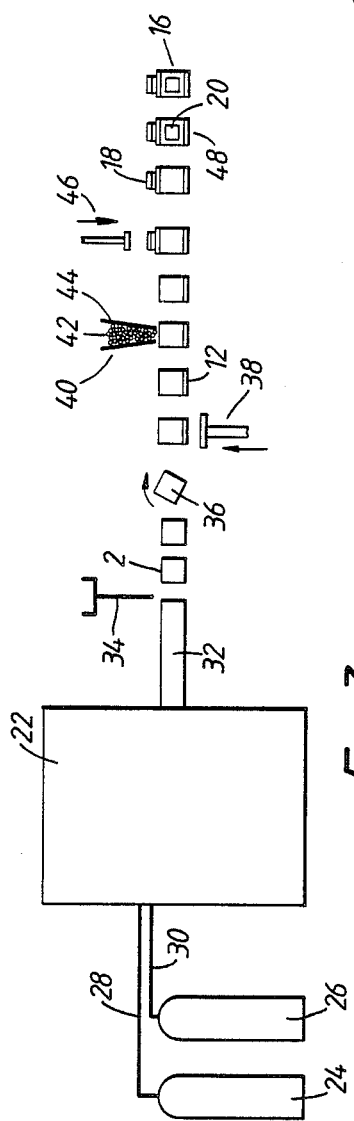
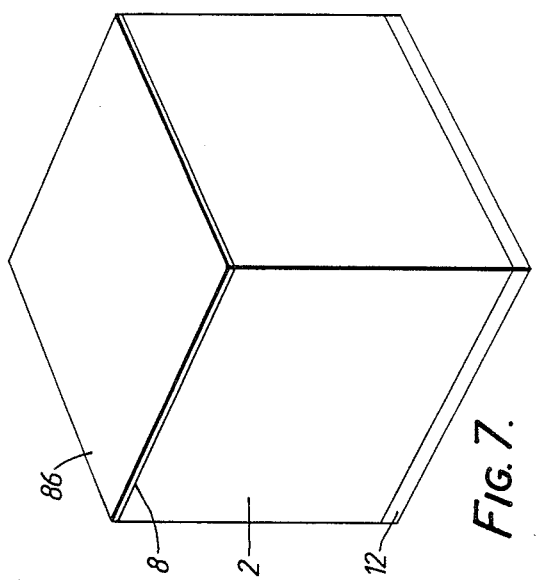

MANUFACTURING CONTAINERS FROM MULTILAYERED MATERIAL

BACKGROUND OF THE INVENTION

The present invention relates to a method of and apparatus for manufacturing containers.

It is known to package pharmaceutical tablets or pills in individual plastics or glass containers. With such containers the shape and dimensions of the internal cavity are determined by and correspond generally to the external shape and dimensions of the container. In order to optimise the size of the cavity in relation to the amount of material required for the body of the container, the container often has a cylindrical cavity and a cylindrical outer surface. However, cylindrical containers are difficult to package efficiently in bulk since the side wall of the container is not flat and so adjacent containers have wasted space therebetween. Furthermore, such containers are required to be produced in a number of sizes, each of which is adapted to carry a particular amount of the product, i.e. number of pills or tablets. This is inconvenient since each size of the container must be packed into its appropriately sized packaging, which requires a multiplicity of sizes of packaging. The requirement for a number of different sizes of containers results in different pallet sizes when the containers are transported in bulk and this can make it difficult to package different sized containers with each other. The requirements for different sized containers and packaging can give stockholding problems. Also, the outer curved surface of cylindrical containers is relatively difficult to label.

The present invention aims to overcome the above discussed problems of the prior art.

SUMMARY OF THE INVENTION

The present invention provides a method of manufacturing containers, the method comprising the steps of:

(a) extruding an elongate tube of plastics material, the tube having a rectangular outer cross-section and an elongate central cylindrical cavity;

(b) cutting the tube transversely into a plurality of container body portions;

(c) sealing a base to one end of each body portion; and (d) sealing a top to the other end of each body portion.

The present invention further provides apparatus for manufacturing containers, comprising an extrusion device for extruding an elongate tube of plastics material, the tube having a rectangular cross-section and an elongate central cylindrical cavity, a cutting device for cutting the tube transversely into a plurality of container body portions, a first sealing means for sealing a base to one end of each body portion and a second sealing means for sealing a top to the other end of each body portion.

BRIEF DESCRIPTION OF THE DRAWINGS

Embodiments of the present invention will now be described by way of example only with reference to the accompanying drawings, in which

FIG. 3 is a schematic diagram of an apparatus for producing the container of FIG. 2;

FIG. 7 is a perspective view of an alternative embodiment of a container when made in accordance with the present invention;

DESCRIPTION OF THE PREFERRED EMBODIMENTS

Figure 1:
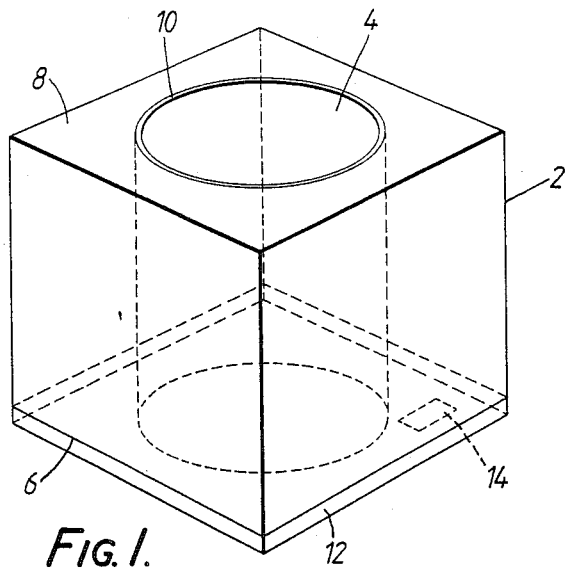
FIG. 1 is a perspective view of a container body portion and base when made in accordance with the present invention.

Referring to FIG. 1, a container body portion 2 has an elongate central cylindrical cavity 4 extending between two end faces 6, 8 thereof. The cross-section of the body portion 2 is rectangular, preferably square, so that the external longitudinal surface of the body portion 2 is comprised of four flat faces. The body portion 2 is composed of a foamed plastics material, such as polystyrene, which has been formed by extrusion. The cylindrical cavity 4 is lined with a tubular sleeve 10 of sterile plastics material which has been co-extruded with the body portion 2. A base 12 is sealed to one end face 6 of the body portion 2. The base 12 comprises a plastics layer which has been heat sealed or adhered to the end face 6. Typically, the base 12 is a pressure sensitive vinyl which has been thermoformed onto the end face 6. Alternatively, the base 12 is a vinyl sheet which is adhered to the end face 6 by a layer of adhesive. The base 12 may be provided with a strip of magnetic material 14 for recording information relating to the container. For example, the strip of magnetic material 14 could store information such as the filling date of the container, the serial number of the product, the maximum and minimum temperature to which the contents of the container can be subjected without degradation, etc.

Figure 2:
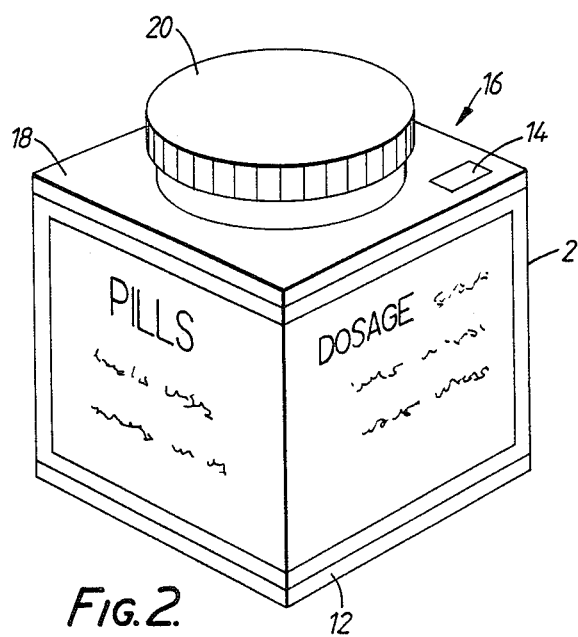
FIG. 2 is a perspective vie of a container when made in accordance with the present invention and including the container body portion and base of FIG. 1.

FIG. 2 shows a container 16 made in accordance with the invention which incorporates the body portion 2 and base 12 assembly shown in FIG. 1. The container 16 has a top 18 which is typically of plastics material and is sealed to the other end face 8 of the body portion either by heat sealing or by an adhesive The top 18 includes a removable closure 20 for access to the cavity 4. If desired, the top 18 may be provided with a tamper indicative band for indicating whether or not the container has been opened. Furthermore, the top 18 may be provided with the strip of magnetic material 14 rather than the base 12. A label 20, which is typically a self-adhesive paper label, is applied to the outer surface of the body portion 2.

The manufacture of the container of FIG. 2 will now be described with reference to FIG. 3. An extrusion apparatus 22 is fed with a supply of foamable plastics material to form the body portion 2 and with a supply of plastics material to form the tubular sleeve 10 from respective reservoirs 24, 25 via respective conduits 28, 30. The extrusion apparatus 22 is of a known construction and has a die which forms an elongate foamed tube 32 which has a rectangular cross-section and a central cylindrical cavity which is lined with sleeve 10. The extruded tube 32 exits from the extrusion apparatus 22 and is passed to a cutting station at which a cutter 34 cuts the tube transversely into a plurality of body portions 2. The body portions 2 are then conveyed by a conveyor (not shown) to a rotating station 36 at which the body portions are turned through 90° by a rotating device (not shown) so that a transverse end face of each of the body portions 2 is directed downwardly. The body portions 2 then are passed by the conveyor to a base applying station 38 at which a base 12 is sealed to each body portion 2. The body portion 2 and base 12 assembly is then conveyed to a filling station 40 at which the cavity in the body portion 2 is filled with a specified amount of a product, e.g. pills 42, from a hopper 44. The filled body portion 2 then passes to a top applying station 46 where a top 18 is sealed to the upwardly directed end face 8 of the body portion to form the container 16. The filled containers 16 are then conveyed to a label applying station 48 at which labels 20 are applied to the containers 16. When the containers are provided with a strip of magnetic material 14, pack information is recorded onto the strip of magnetic material 14 at this stage. The containers 16 are then packaged or stacked in bulk on a pallet (not shown).

Figure 4:
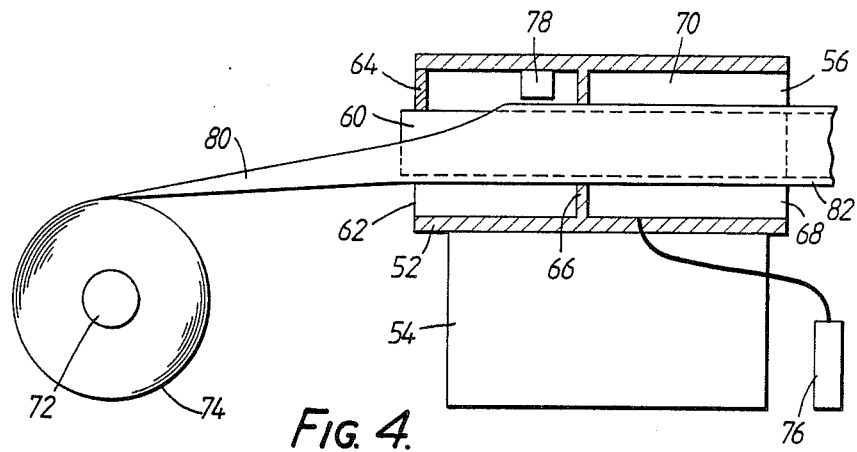
FIG. 4 is a diagrammatic part-sectional side view of an alternative extrusion apparatus for producing container body portions in accordance with the present invention.
Figure 5:
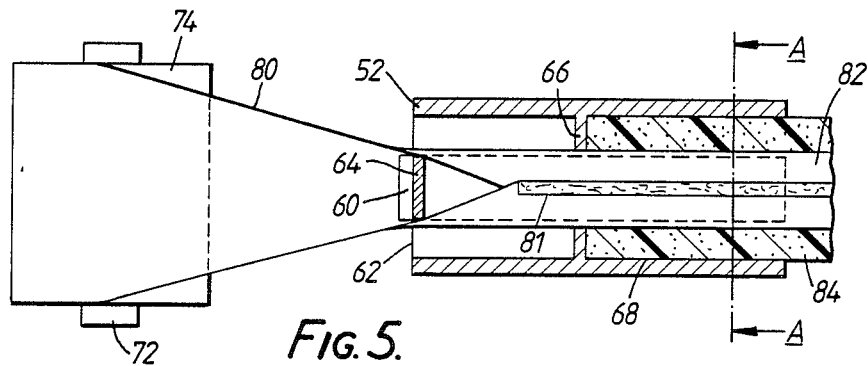
FIG. 5 is a diagrammatic part-sectional top view of the apparatus of FIG. 4.
Figure 6:
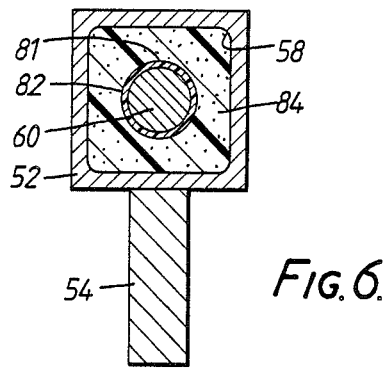
FIG. 6 is a section on line A—A of the apparatus of FIG. 5.

An alternative extrusion apparatus for producing container body portions in accordance with the present invention will now be described with reference to FIGS. 4 to 6. An extrusion apparatus comprises an extrusion die 52 mounted on a base 54. The die 52 has a square internal cavity 56 with radiased corners 58. Mounted in the centre of the cavity 56 is a cylindrical mandrel 60 which extends longitudinally therealong. The mandrel 60 is fixed to the die 52 at an input end 62 of the die 52 by means of a support member 64 which extends between the top of the end of the mandrel 60 and an upper part of the die 52. Located substantially centrally in the die 52 and around the mandrel 60 is a transverse annular wall 66 which separates the input end 62 of the die 52 from the output end 68, which incorporates a foam-forming chamber 70. The radius of the circular hole in the annular wall 66 is slightly greater than that of the mandrel 60 whereby a small gap surrounds the mandrel 60. An axle 72 for supporting a roll of plastics sheet 74 is located adjacent the input end 62 of the die 52. A supply of foam-forming material 76 is connected to the foam-forming chamber 70. A welding device 78, such as an ultrasonic welding unit or a heat welding device is provided upstream of the annular wall 66 and above the mandrel 60.

The use of the apparatus to form extruded container body portions will now be described. A roll of plastics sheet 74, such as polyethylene, vinyl, or polyester sheet is mounted on the axle 72 and fed off therefrom. The sheet 80 has a width which is substantially the same as or slightly greater than the circumference of the mandrel 60. The sheet 80 is wrapped around the mandrel 60 from the bottom of the mandrel 60 to the top thereby to form an elongate join above the top of the mandrel 60. The welding device 78 welds the join together at a welded region 81 thereby to form a tube 82 of plastics sheet which closely surrounds the mandrel 60. The tube 82 passes through the annular wall 66 into the foam-forming chamber 70 into which foam forming material is injected The foam-forming material expands in the foam-forming chamber 70 to fill the foam-forming cavity and form an elongate tube 84 of foam around the tube 82 of plastics material. The composite tubular structure is continuously printed out of the die 52 by the pressure of the injected foam-forming material. Thus it will be seen that the apparatus can continuously form an extruded foam tube with a plastics lining from inputted foam-forming material and plastics sheet. The extruded foam tube may be wrapped with a plastics sheet after exiting from the extrusion die. The plastics sheet may be a tube of heat-shrinkable material which is heat shrunk around the elongate foam tube or a sheet which is wrapped around the elongate foam tube and then joined together along a seam e.g. by heat welding or by means of an adhesive. The extruded foam tube may be cut into lengths of e.g. 5 meters and then those lengths can subsequently be cut into a plurality of individual container body portions 2.

FIG. 7 shows an alternative embodiment of a container made in accordance with the present invention. The container body portion 2 and the base 12 are the same as those of FIGS. 1 and 2. However, the top 86 consists of a laminar material, such as a vinyl sheet, which is adhered or welded to the end face 8 of the container body portion 2. The laminar top 86 seals the container but can be removed to open the container by being torn off This structure can provide a "child-proof" container suitable for pharmaceutical pills or capsules. The laminar top 86 could be attached to the body portion 2 so as to be separable therefrom by tearing Optionally, the laminar top 86 may be provided at one cover thereof with an unattached tab portion which can easily be gripped manually and pulled so as to open the container.

Figure 8:
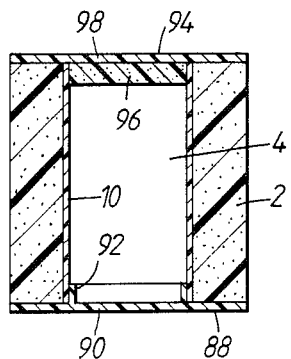
FIG. 8 is a sectional view through a further alternative embodiment of a container when made in accordance with the present invention.

FIG. 8 shows a container in accordance with a further embodiment of the present invention. The container body portion 2 is the same as that of the previous figures but the top and base are not. The base 88 is of a pre-moulded plastics and consists of a base wall 90 which has integral therewith a centrally located tubular cylindrical flange 92. The flange 92 is adapted closely to fit inside the lined cylindrical cavity 4. The flange 92 typically has a height of 5 to 10 millimeters and therefore has a relatively large outer tubular area which is adjacent the tubular sleeve 10 The base 88 may be held in position merely by a press-fit, but it is preferred, especially when the container is intended to hold liquids and so is required to be impervious to liquids, to adhere together the tubular sleeve 10 and the base 88. This may be done either by means of adhesive or by welding e.g. by heat, the tubular sleeve 10 and the flange 92 together. If desired, the flange 92 may have a much greater height than that illustrated in FIG. 8 thereby to extend a substantial length into the cylindrical cavity 4. In this way, the flange 92 can enhance the strength of the container. Furthermore, the base may be formed of or coated with a non-slip material e.g. a rubberised material so as to make the bottom of the container resilient to sliding.

The top 94 comprises a bung 96 of polystyrene or vinyl and a sheet 98 of vinyl which is adhered or welded over the top of the body portion 2. In order to made the top 94, the bung 96 is initially pressed into the cylindrical cavity 4 and then the vinyl sheet 98 is laid thereover. The vinyl sheet 98 is then adhered or welded to the bung 96 thereby to form an integral top 94. This arrangement is convenient to produce in a continuous manufacturing process without the requirement for pre-moulded tops.

Figure 9:
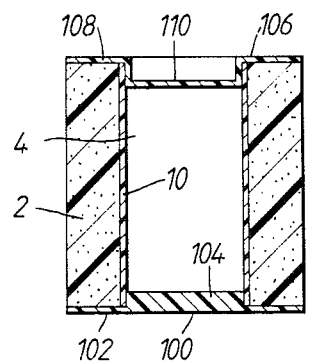
FIG. 9 is a sectional view through another embodiment of a container when made in accordance with the present invention.

FIG. 9 shows yet another embodiment of a container in accordance with the invention. In this embodiment, the base 100 is pre-moulded and comprises a base wall 102 with an integral disc-like bung 104. Preferably, the bung 104 is welded to the tubular sleeve 10 in the manner described with reference to FIG. 8. The top 106 consists of a vinyl sheet 108 with a circular indent 110 which is press-fit into the cylindrical cavity 4. Preferably, the top 106 is fixed to the body portion 2 by welding.

Figure 10:
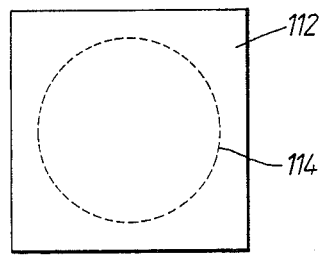
FIG. 10 is a top view of a container in accordance with a further embodiment of the present invention.

FIG. 10 shows an alternative embodiment of a container in accordance with the invention in which the top 112 of the container is formed of a vinyl sheet which is adhered or welded to the body portion 2. The vinyl sheet 112 is provided with a circular line of perforations 114 which can be broken thereby to access the inside of the container. It will be apparent that the line of perforations may be of alternative arrangements from that illustrated.

Figure 11:
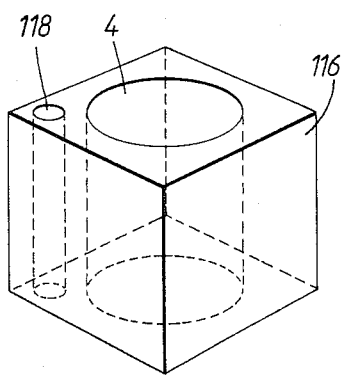
FIG. 11 is a perspective view of a container in accordance with yet another embodiment of the present invention.

FIG. 11 shows a container body portion in accordance with a further embodiment of the present invention. The container body portion 116 consists not only of the centrally-located cylindrical cavity 4 but also of a second elongate, preferably cylindrical cavity 118 in a corner thereof. The second cavity 118 may be employed to contain a product or substance relating to that which is intended to be contained within the first cylindrical cavity 4. For example, when the first cylindrical cavity is intended to contain paint, the second cavity 118 may contain a pigment or a solvent for the paint. Alternatively, the second cavity. 118 may be dimensioned so as to be able to hold a paint brush or other article.

Figure 12:
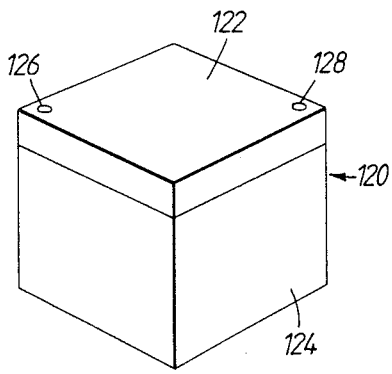
FIG. 12 is a perspective view of a container in accordance with a further embodiment of the present invention.

FIG. 12 shows yet another container in accordance with the invention. The illustrated container 120 consists of a body portion and a base which is similar to those described hereinabove. The top consists of a block 122 e.g. of foamed material which is held on the body portion 124 by means of two rods 126, 128 which extend between the block 122 and the body 124. The rods 126, 128 are slidably mounted in respective bores in respective corners of the block 122 and the body portion 124. When it is desired to open the container 120, a user slides one of the rods out of engagement with either the block 122 or the body portion 124 whereby the block 122 and body portion 124 can be rotated relative to each other about the other rod. This provides a container which is child-proof.

It will be seen that the external shape of the containers made in accordance with the invention is not related to the shape of the cavity therein. Thus, with the invention the outer shape and dimensions can be selected as desired without any effect on the shape and dimensions of the cavity whereby the containers can be made so as to reflect the dimensions of a pallet so as to facilitate stacking of a number of containers on the pallet in an efficient manner.

Furthermore, the size of the cavity within any container of given external shape and dimensions can be varied as desired depending upon the volume of product to be contained within the cavity. For example, a pill container could have a body portion 2 with external dimensions of 50 mm $\times$ 50 mm $\times$ 50 mm with an internal cylindrical cavity having a diameter of either 10 mm for a given number of small pills or 20 mm for ten times that given number of small pills. In this way, containers of the same external dimensions can be used to package varying amounts of products, with the diameter of the cavity being selected in accordance with the required capicity of the container. The provision of uniform external shape and dimension of the containers facilitate the manufacture of different capacity containers since it is only required to adjust the diameter of the cavity. This could be done by changing the mandrel in the extrusion apparatus which is used to form the cavity.

The method of the present invention can permit on-site manufacture of containers as part of the filling line. This obviates the need for stockholding of containers since the containers are manufactured just prior to being filled in a continuous process.

The external shape of the containers made in accordance with the invention has an advantage over the known cylindrical containers in that it is much easier to label containers having flat faces than containers having curved faces. This particularly applies when the labels are applied by an automatic labelling machine. Also, the end user of the container is likely to find it more easy to hold a container having a rectangular or square cross section than a container having a circular cross-section.

I claim:

1. A method of manufacturing containers, the method comprising the steps of:
    (a) extruding an elongate tube of plastics material, the tube having a rectangular outer cross-section and an elongate central cylindrical cavity;
    (b) cutting the tube transversely into a plurality of container body portions;
    (c) sealing a base to one end of each body portion; and
    (d) sealing a top to the other end of each body portion.

2. A method according to claim 1, wherein the diameter of the elongate central cylindrical cavity is a selected one of a plurality of diameters.

3. A method according to claim 1, wherein after the base as been sealed to the said one end of each body portion the cavity in the body portion is filled with a product and then the top is sealed to the said other end of the end portion.

4. A method according to claim 1, wherein the plastics material is a foamed material.

5. A method according to claim 1, wherein a tubular sleeve of plastics material which lines the elongate central cylindrical cavity is co-extruded with the elongate tube.

6. A method according to claim 1, wherein the elongate tube is extruded around a tubular sleeve of plastics material, the tubular sleeve having been formed by welding together two longitudinal edges of a sheet of the plastics material.

7. A method according to claim 1, wherein the top includes a removable closure for the container.

8. A method according to claim 1, wherein the top comprises a plastics sheet.

9. A method according to claim 1, wherein the top or the base is provided with a strip of magnetic material for recording information relating to the container.

10. Apparatus for manufacturing containers, comprising an extrusion device for extruding an elongate tube of plastics material, the tube having a rectangular cross-section and an elongate central cylindrical cavity, a cutting device for cutting the tube transversely into a plurality of container body portions, a first sealing means for sealing a base to one end of each body portion and a second sealing means for sealing a top to the other end of each body portion.

11. Apparatus according to claim 10, wherein the extrusion device is adjustable whereby the diameter of the cylindrical elongate central cavity is a selected one of a plurality of diameters.

12. Apparatus according to claim 10, further comprising means for filling the cavity with a product after the base has been sealed to the said one end of each body portion.

13. Apparatus according to claim 10, wherein the extrusion device is adapted to co-extrude with the elongate tube a tubular sleeve of plastics material which lines the elongate central cylindrical cavity.

14. Apparatus according to claim 10, wherein the extrusion device comprises means for forming a tubular sleeve from a sheet of plastics material by welding together the two longitudinal edges of the sheet and the extrusion device is adapted to extrude the elongate tube around the tubular sleeve.

* * * * *